United States Patent [19]

Lind

[11] Patent Number: 4,970,422
[45] Date of Patent: Nov. 13, 1990

[54] DEVICE WITH A THRUST BEARING

[75] Inventor: Bjorn Lind, Billdal, Sweden

[73] Assignee: SKF Nova AB, Gorteborg, Sweden

[21] Appl. No.: 391,400

[22] Filed: Aug. 8, 1989

Related U.S. Application Data

[63] Continuation of Ser. No. 201,487, Jun. 1, 1988, abandoned, which is a continuation of Ser. No. 825,805, Feb. 4, 1986, abandoned.

[30] Foreign Application Priority Data

Feb. 4, 1985 [SE] Sweden .................................. 8500481

[51] Int. Cl.⁵ .............................................. H02K 7/09
[52] U.S. Cl. ......................................... 310/90; 310/42; 310/51; 310/90.5; 310/154; 310/156; 310/254; 310/261; 384/123
[58] Field of Search ................. 310/90.5, 90, 51, 181, 310/152, 154, 156, 254, 261, 268, 42; 384/121, 123, 124, 223

[56] References Cited

U.S. PATENT DOCUMENTS

| | | | |
|---|---|---|---|
| 3,791,704 | 2/1974 | Perper | 310/90.5 |
| 3,955,858 | 5/1976 | Poubeau | 310/90.5 |
| 4,076,340 | 2/1978 | Meinke | 310/90.5 |
| 4,147,396 | 4/1979 | Lyman | 310/90.5 |
| 4,153,993 | 5/1979 | Kataoka | 310/90.5 |

FOREIGN PATENT DOCUMENTS

| | | |
|---|---|---|
| 0061016 | 9/1982 | European Pat. Off. . |
| 0854730 | 9/1952 | Fed. Rep. of Germany ..... 310/90.5 |
| 082548 | 6/1983 | Fed. Rep. of Germany . |

Primary Examiner—R. Skudy
Attorney, Agent, or Firm—Eugene E. Renz, Jr.

[57] ABSTRACT

A rotatable element is arranged on a supporting member. The element is freely rotatable and displaceable radially by being held in position by two portions attracting each other, said portions being made of magnetic material, and that a plane slot separates the supporting member and the element. The driving of the element can be effected thereby that the element forms or incorporates a rotor in an electromotor, the stator of which is arranged in an area of the supporting member.

2 Claims, 1 Drawing Sheet

FROM PRESSURIZED GAS SOURCE

DEVICE WITH A THRUST BEARING

This is a continuation of copending application(s) Ser. No. 07/201,487 filed on June 1, 1988 and Ser. No. 06/825,805 filed on Feb. 4, 1985 now abandoned.

BACKGROUND OF THE INVENTION

It is earlier known to use devices having e.g. gas bearings for axial and radial supporting of rotatable elements. Such a device is shown e.g. in European patent application No. 82201555.8 bearing the publication No. 0082548. This bearing gives low friction and thereby possibilities of using high rotational speeds without big power losses. Using higher speeds in the known device necessitates that the rotatable element is accurately balanced and centered in the bearing device. Vibrations caused by imbalance can easily damage a bearing taking up radial forces and also the machine members connected to the bearing.

In the device accordingly to the above-mentioned publication, the rotatable elements is subjected to axial load by aid of magnetic means until contact is obtained in the thrust bearing, which implies that the element can be removed by being pulled axially from a central shaft journal, which guides the element in radial direction and has a radial bearing surface. Exchange of the element thus requires a considerable free space axially outside the device and requires an accurate aligning of the element on the shaft journal at assembly. The shaft journal and the tubular shaft of the rotatable element arranged thereupon gives the device a big axial extension.

Thrust bearings in which a rotatable element is arranged to cooperate with a plain surface upon a supporting member and is freely displaceable in radial direction upon this surface are earlier known. A slot between the rotatable element and the supporting element can thereby be maintained by introduction of a pressure medium between the elements, e.g. according to European patent application No. 0061016. This publication, however, does not show how the movable element shall be held in desired position upon the plain surface of the supporting element.

The slot can be maintained by electromagnetic means, e.g. according to U.S. Pat. No. 4,147,396. Magnetic attraction forces hereby give a centering effect on the rotatable element. A complicated control of the electric current to the magnets is, however, required in order to maintain a desired slot height, which makes the device expensive and has a negative influence upon the reliability of service.

SUMMARY OF THE INVENTION

The purpose of the present invention is to provide a device of the kind defined in the preamble, in which the rotatable element can be allowed to rotate at high speed upon the supporting member without requirements on accurate centering and complicated control of the space between the opposed plain surfaces and in which exchange of the rotatable element can be effected without need of a big axial space. To this end, the rotatable element and support member have confronting axially spaced planar surfaces and means is provided for directing a pressure medium in the space between the confronting surfaces to separate the same. The support member and the rotatable element likewise include portions of magnetic material arranged along the rotational axis of the rotatable element which are mutually interspaced and attract each other and wherein the mounting means of the rotor permits free displacement thereof in a truly radial direction to facilitate replacement when desired.

A device according to the invention can be designed with a small axial extension and it can operate without a rapid rotation of the rotatable element causing appreciable vibrations in the supporting member of the device.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
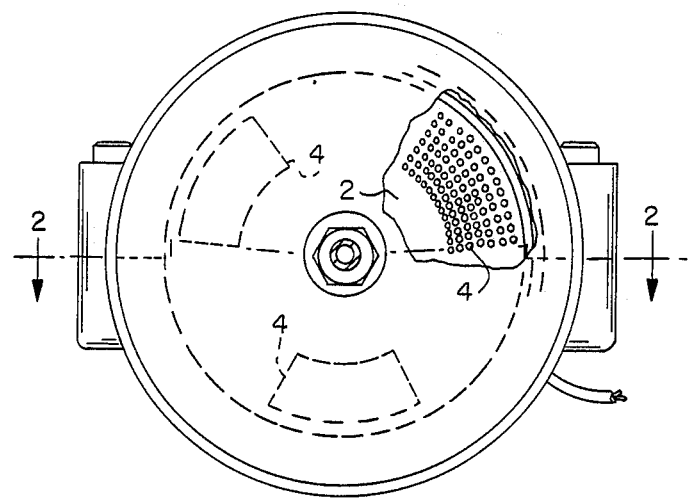
FIG. 1 is a top view of one embodiment in the invention partially cutaway.
Figure 2:
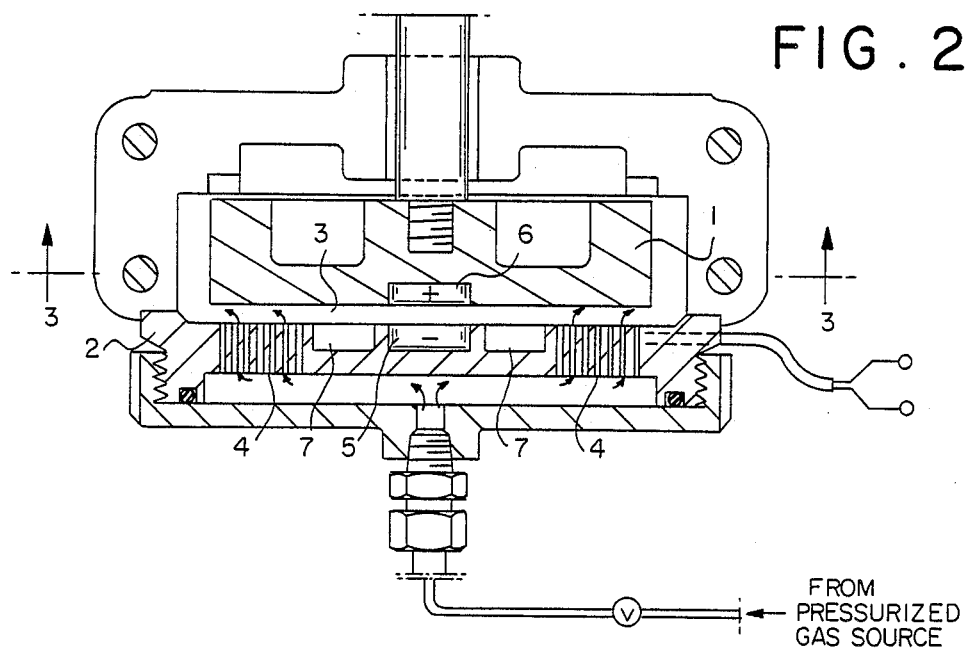
FIG. 2 is a partial sectional view taken along lines 2—2 of FIG. 1.
Figure 3:
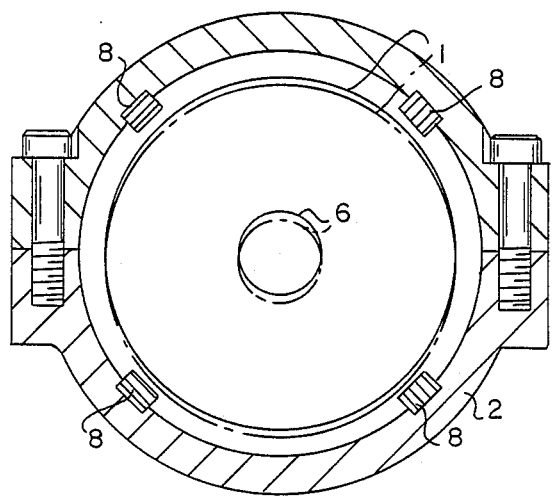
FIG. 3 is a sectional view taken along lines 3—3 of FIG. 2.

The device shown incorporates an element 1, e.g. a spinning cap of a so-called open end spinning machine or a centrifugal rotor, which element is rotatably supported on a supporting member 2. The supporting member 2 and the element 1 has one mainly plane surface each, which surfaces form opposed bearing surfaces and are separated by a pressure medium, preferably air, by the surfaces being arranged thus that the pressure medium can be introduced in a slot 3 between them. This can be achieved by at least one portion of one of the surfaces defining the slot being arranged thus that the pressure medium can pass into the slot, e.g. through a gas permeable material 4 limiting a portion of the slot, or through a material, in which channels for gas through-flow have been made. The pressure gas can be supplied through one or more connections to a pressure gas source. This arrangement can be accomplished in a plurality of different manners and is not shown in the drawing. The path of the gas through the material 4 and the slot 3 is shown by arrows.

The supporting member and the rotatable element incorporate, according to the invention, means which effect that portions of the supporting member and the rotatable element influence each other with attracting forces upon the rotatable element under simultaneous possibility of displacement thereof in directions perpendicular to the rotational shaft. For this purpose according to the embodiment of the invention shown, the supporting member and the rotatable element are provided with one central portion each 5, 6, consisting of a magnetic material, which portions attract each other. During operation the pressure gas flowing in the slot 3 thus tends to make the slot wider, whereas the magnetic portions 5, 6, strive to close to the slot. A power equlibrium will normally arise when the height of the slot is less than 1 millimeter and the portions 5, 6 are situated just in front of each other.

Driving of the element 1 can conveniently be effected in a manner known per se, with an electric motor arranged thus that the stator windings are located in connection to the mainly plane surface of the supporting member 2, e.g. in a recess 7, and a rotor is located on or is constituted by the rotatable element. As a plain slot is provided between the stator and rotor of the motor and the rotor thereby is radially movable, it is possible for the rotor, i.e. the element 1, always to rotate about its dynamical mass center, whereby the element is always balanced and causes insignificant vibration only. The embodiment is particularly expedient if the element 1 during operation carries a mass which is variable to position and size, whereby the device is automatically balanced by the element 1 adjusting itself to balance position.

The stability of the device is put to an upper limit if the load carrying pressure gas is allowed to act at an optimum distance from the outer edge of the element 1. If thereby e.g. the rotational shaft of the element 1 should tend to be tilted then the slot over a gas permeable area would tend to be reduced, whereby the pressure is increased in this area and the tendency of tilting is counteracted.

In some cases it can be appropriate that the position of the element 1 is stabilized, e.g. if it is necessary that the position of its rotational shaft is accurately determined. For this purpose it is possible to provide the device with means 8 for actuation of the element 1 radially to take up an eccentric position against the action of the centering force caused by the portions 5, 6 attracting each other. The means 8 can incorporate a supporting bearing which cooperates with a cylindric outer surface on the element 1, which surface is urged against the supporting bearing by the force between the portions 5, 6.

Embodiments of the invention other than the one described hereabove are also possible within the scope of the claims. The pressure in the medium in the slot 3 can be generated by the rotation of the element 1 instead of coming from an outer pressure source or as a complement thereto. At least one of the portions 5, 6 may, e.g. if it is magnetic, be designed as a ring. The driving of the rotatable element 1 can be effected with other means than by an electric motor, e.g. with pneumatic or mechanical means.

What is claimed is:

1. A bearing mechanism, comprising:
   supporting member having an axially spaced planar support surface;
   a rotatable element with an axis of rotation and being rotatably carried by said supporting member and having an axially spaced planar rotatable surface, said support surface and rotatable surface being confronting and defining a space therebetween;
   power means for maintaining a force equilibrium between said supporting member and said rotatable element, said power means including a first magnetic material in the confronting surface of said supporting member and arranged along the rotational axis of said rotatable element, said power means further including a second magnetic material in the confronting surface of said rotatable element and arranged along the rotational axis thereof, said first and second magnetic materials having opposite polarities to cause a force of mutual attraction;
   said power means further including pressure directing means for directing a pressure medium into said space between said confronting surfaces, said pressure medium operating against said force of mutual attraction of said first and second magnetic materials;
   an electric drive motor having a stator and a rotor, said stator being mounted in said supporting member in proximity to said confronting support surface, and said rotor forming at least a portion of said rotatable confronting element and being positioned to rotate about said rotatable element, said rotatable elements having a dynamic mass center about said rotational axis to thereby balance said rotatable element, reduce vibration and counteract any tendency of said element and rotor to tilt;
   said stator including a gas permeable portion radially centered about said axis and connected to said pressure directing means for directing said pressure medium against said rotor, said stator further including an axially centered recess and stator windings enclosed by said recess; and
   centering means located at a plurality of equidistant about the periphery of said rotatable element for contact with said element during rotation to limit movement of said rotatable element away from said axis.

2. A bearing mechanism, comprising:
   a supporting member having an axially spaced planar support surface;
   a rotatable element with an axis of rotation and being rotatably carried by said supporting member and having an axially spaced rotatable surface, said support surface and rotatable surface being confronting and defining a space there between;
   power means for maintaining a force equilibrium between said supporting member and said rotatable element, said power means including a first magnetic material in the confronting surface of said supporting member and arranged along the rotational axis of said rotatable element, said power means further including a second magentic material in the confronting surface of said rotatable element and arranged along the rotational axis thereof, said first and second magnetic materials having opposite polarities to cause a force of mutual attraction;
   said power means further including pressure directing means for directing a pressure medium into said space between said confronting surfaces, said pressure medium operating against said force of mutual attraction of said first and second magnetic materials;
   an electric drive motor having a stator and a rotor, said stator being mounted in said supporting member in proximity to said confronting support surface, and said rotor forming at least a portion of said rotatable element having a dynamic mass centered about said rotational axis to thereby balance said rotatable element, reduce vibration and conteract any tendency of said element and rotor to tilt;
   said stator including a gas permeable portion radially centered about said axis and connected to said pressure directing means for directing said pressure medium against said rotor, said stator further including an axially centered recess and stator windings enclosed by said recess; and
   the geometric structure of the motor and magnetic material permitting free displacement of the rotor in a truly radial direction to facilitate replacement of the rotor when desired.

* * * * *